(12) United States Patent
Li et al.

(10) Patent No.: US 12,500,723 B2
(45) Date of Patent: Dec. 16, 2025

(54) RESOURCE ALLOCATION METHOD AND RELATED DEVICE

(71) Applicant: HUAWEI TECHNOLOGIES CO., LTD., Shenzhen (CN)

(72) Inventors: Youguo Li, Dongguan (CN); Jianjun Qiu, Dongguan (CN); Qi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 18/190,493

(22) Filed: Mar. 27, 2023

(65) Prior Publication Data

US 2023/0239110 A1 Jul. 27, 2023

Related U.S. Application Data

(63) Continuation of application No. PCT/CN2021/115305, filed on Aug. 30, 2021.

(30) Foreign Application Priority Data

Sep. 29, 2020 (CN) .......................... 202011052575.X

(51) Int. Cl.
*H04L 5/00* (2006.01)
*H04W 8/02* (2009.01)
*H04W 64/00* (2009.01)

(52) U.S. Cl.
CPC ............. *H04L 5/0051* (2013.01); *H04W 8/02* (2013.01); *H04W 64/00* (2013.01)

(58) Field of Classification Search
CPC ...... H04L 5/0051; H04L 5/0048; H04W 8/02; H04W 64/00

(Continued)

(56) References Cited

U.S. PATENT DOCUMENTS

| 2022/0248385 A1* | 8/2022 | Cha ................... H04W 52/0216 |
| 2022/0407639 A1* | 12/2022 | Ren ........................ G01S 5/0244 |
| 2024/0305428 A1* | 9/2024 | Shreevastav .......... H04W 64/00 |

FOREIGN PATENT DOCUMENTS

| CN | 107113665 A | 8/2017 |
| CN | 109155947 A | 1/2019 |

(Continued)

OTHER PUBLICATIONS

CATT: "UL Reference Signals for NR Positioning," 3GPP TSG RAN WG1 Meeting #98bis Chongqing, China, Oct. 14-20, 2019. R1-1910319, total 7 pages.

(Continued)

*Primary Examiner* — Rownak Islam
(74) *Attorney, Agent, or Firm* — Rimon PC

(57) ABSTRACT

This application discloses a resource allocation method and a related device, to effectively avoid an inter-cell SRS resource conflict. The method in this application includes: A target base station receives a first correspondence from a location management function LMF, where the first correspondence indicates that a first user equipment UE uniquely corresponds to a first SRS resource in a plurality of cells, the plurality of cells include a cell served by the target base station, and the first UE is located in the cell served by the target base station. The target base station allocates the first SRS resource to the first UE based on the first correspondence.

19 Claims, 4 Drawing Sheets

(58) Field of Classification Search
USPC .......................................................... 370/329
See application file for complete search history.

(56) References Cited

FOREIGN PATENT DOCUMENTS

| EP | 3923501 A1 | 12/2021 |
|---|---|---|
| EP | 3923651 A1 | 12/2021 |
| WO | 2014146289 A1 | 9/2014 |
| WO | 2020089276 A1 | 5/2020 |
| WO | 2020145700 A1 | 7/2020 |
| WO | 2020164334 A1 | 8/2020 |
| WO | 2020164405 A1 | 8/2020 |
| WO | 2020164514 A1 | 8/2020 |
| WO | 2020167055 A1 | 8/2020 |
| WO | 2021233705 A1 | 11/2021 |

OTHER PUBLICATIONS

Huawei, HiSilicon, Considerations on UL only positioning method in NR. 3GPP TSG-RAN WG2 Meeting #107bis, Chongqing, China, Oct. 14-18, 2019, R2-1913039, 6 pages.
3GPP TS 38.455 V16.0.0 (Jul. 2020), 3rd Generation Partnership Project; Technical Specification Group Radio Access Network; NG-RAN; NR Positioning Protocol A (NRPPa) (Release 16), 60 pages.

\* cited by examiner

RESOURCE ALLOCATION METHOD AND RELATED DEVICE

CROSS-REFERENCE TO RELATED APPLICATIONS

This application is a continuation of International Application No. PCT/CN2021/115305, filed on Aug. 30, 2021, which claims priority to Chinese Patent Application No. 202011052575.X, filed on Sep. 29, 2020. The disclosures of the aforementioned applications are hereby incorporated by reference in their entireties.

TECHNICAL FIELD

This application relates to the field of communication technologies, and in particular, to a resource allocation method and a related device.

BACKGROUND

In a 5th generation new radio (5G NR) system, a sounding reference signal (SRS) is an uplink reference signal sent by user equipment (UE) to a base station. The SRS can be used for positioning. For example, the base station may allocate a specific SRS resource to the UE, so that the UE sends the SRS on the resource. The base station performs time of arrival (TOA) measurement on the resource, and feeds back a measurement result to a core network side, so that the core network side determines a location of the UE based on the measurement result.

However, when the UE moves from a cell served by the base station to a neighboring cell, an SRS resource conflict may occur. For example, a first UE moves from a cell served by a first base station to a cell served by a second base station, and an intersection set exists between resources provided by the first base station and the second base station. Therefore, when the first base station allocates an SRS resource in the intersection set to the first UE for use, if the second base station has allocated the SRS resource to a second UE for use, the first UE and the second UE use the same SRS resource. Consequently, an inter-cell SRS resource conflict occurs.

SUMMARY

Embodiments of this application provide a resource allocation method and a related device, to effectively avoid an inter-cell SRS resource conflict.

A first aspect of embodiments of this application provides a resource allocation method. The method includes:

When a location management function (LMF) in a core network determines that first UE in a location area (LA) needs to be positioned, a cell in which the first UE in the LA is located may be determined, to determine a target base station that serves the cell. Then, the LMF selects, from resources that can be provided by the target base station, an SRS resource uniquely available for the first UE. Specifically, the LMF may construct a unique correspondence between the first UE and a first SRS resource, namely, a first correspondence. It should be noted that the LA is a closed area, and includes a plurality of cells. The plurality of cells include the cell served by the target base station.

Then, after obtaining the first correspondence, the LMF sends the first correspondence to the target base station. After receiving the first correspondence, the target base station may allocate the first SRS resource to the first UE based on the first correspondence, so that the first UE may send an SRS on the first SRS resource.

It can be learned from the foregoing resource allocation method that, in this application, an allocation relationship (a correspondence) between an SRS resource and UE is managed by the LMF, and the base station is an executor of resource allocation. When determining that the first UE needs to be positioned in the LA including the plurality of cells, the LMF may construct the unique correspondence between the first SRS resource and the first UE. After receiving the first correspondence from the LMF, the target base station may allocate the first SRS resource to the first UE based on the first correspondence. In the LA, the LMF allocates the first SRS resource only to the first UE for use. Therefore, the remaining UE cannot use the first SRS resource. This can effectively avoid an inter-cell SRS resource conflict.

In a possible implementation, after the target base station allocates the first SRS resource to the first UE based on the first correspondence, the method further includes: The target base station receives information about a plurality of SRS resources from the LMF, where the plurality of SRS resources include the first SRS resource. The target base station performs time of arrival TOA measurement on the plurality of SRS resources based on the information about the plurality of SRS resources, to obtain a measurement result of the first SRS resource. The target base station sends the measurement result of the first SRS resource to the LMF.

In a possible implementation, after the target base station receives the information about the plurality of SRS resources from the LMF, the method further includes: The target base station receives a second correspondence from the LMF, where the second correspondence indicates that a second UE uniquely corresponds to a second SRS resource in the plurality of cells, and the second UE is located in the cell served by the target base station. The target base station allocates the second SRS resource to the second UE based on the second correspondence. The target base station performs TOA measurement on the plurality of SRS resources, to obtain a measurement result of the second SRS resource. The target base station sends the measurement result of the second SRS resource to the LMF.

In a possible implementation, after the target base station receives the information about the plurality of SRS resources from the LMF, the method further includes: The target base station performs TOA measurement on the plurality of SRS resources, to obtain a measurement result of a third SRS resource, where the plurality of SRS resources include the third SRS resource, the third SRS resource uniquely corresponds to a third UE in the plurality of cells, and the third UE is located in a cell served by the remaining base station. The target base station sends the measurement result of the third SRS resource to the LMF.

A second aspect of embodiments of this application provides a resource allocation method. The method includes:

An LMF sends a first correspondence to a target base station, so that the target base station allocates a first SRS resource to a first UE based on the first correspondence. The first correspondence indicates that the first UE uniquely corresponds to the first SRS resource in a plurality of cells, the plurality of cells include a cell served by the target base station, and the first UE is located in the cell served by the target base station.

It can be learned from the foregoing resource allocation method that, in this application, an allocation relationship (a correspondence) between an SRS resource and UE is managed by the LMF, and the base station is an executor of resource allocation. When determining that the first UE needs to be positioned in an LA including the plurality of cells, the LMF may construct a unique correspondence between the first SRS resource and the first UE. After receiving the first correspondence from the LMF, the target base station may allocate the first SRS resource to the first UE based on the first correspondence. In the LA, the LMF allocates the first SRS resource only to the first UE for use. Therefore, the remaining UEs cannot use the first SRS resource. This can effectively avoid an inter-cell SRS resource conflict.

In a possible implementation, after the LMF sends the first correspondence to the target base station, the method further includes: The LMF sends information about a plurality of SRS resources to the target base station, where the plurality of SRS resources include the first SRS resource. The LMF receives a measurement result of the first SRS resource from the target base station. The LMF determines a location of the first UE based on the measurement result of the first SRS resource.

In a possible implementation, after the LMF sends the information about the plurality of SRS resources to the target base station, the method further includes: The LMF sends a second correspondence to the target base station, where the second correspondence indicates that a second UE uniquely corresponds to a second SRS resource in the plurality of cells, and the second UE is located in the cell served by the target base station. The LMF receives a measurement result of the second SRS resource from the target base station. The LMF determines a location of the second UE based on the measurement result of the second SRS resource.

In a possible implementation, after the LMF sends the information about the plurality of SRS resources to the target base station, the method further includes: The LMF receives a measurement result of a third SRS resource from the target base station. The LMF determines a location of a third UE based on the measurement result of the third SRS resource, where the plurality of SRS resources include the third SRS resource, the third SRS resource uniquely corresponds to the third UE in the plurality of cells, and the third UE is located in a cell served by the remaining base station.

A third aspect of embodiments of this application provides a network device. The network device includes a module configured to perform the method according to the first aspect. For example, the network device includes a transceiver module (which may include a sending module and a receiving module) and a processing module. The transceiver module is configured to perform a signal or information receiving and sending operation in the solution according to the first aspect. The processing module is configured to perform an operation other than receiving and sending in the solution according to the first aspect, for example, resource allocation and information measurement.

A fourth aspect of embodiments of this application provides a network device. The network device includes a unit configured to perform the method according to the second aspect. For example, the network device includes a transceiver module (which may include a sending module and a receiving module) and a processing module. The processing module is configured to perform, via the transceiver module, a signal or information receiving and sending operation in the solution according to the second aspect.

A fifth aspect of embodiments of this application provides a processor, configured to perform the method according to any one of the first aspect or the second aspect.

A sixth aspect of embodiments of this application provides a communication apparatus. The communication apparatus may be the base station according to the first aspect, or may be a chip disposed in the base station. The communication apparatus includes a processor that is coupled to a memory, and the processor may be configured to execute a computer program or instructions in the memory, to implement the method performed by a terminal device in any possible implementation of the foregoing solutions. Optionally, the communication apparatus further includes the memory. Optionally, the communication apparatus further includes a communication interface, and the processor is coupled to the communication interface.

When the communication apparatus is the base station, the communication interface may be a transceiver or an input/output interface, configured to receive and send a signal or input/output a computer program or instructions.

When the communication apparatus is the chip disposed in the base station, the communication interface may be an input/output interface, configured to receive and send a signal or input/output a computer program or instructions, where the inputting corresponds to a receiving or an obtaining operation, and the outputting corresponds to a sending operation.

Optionally, the transceiver may be a transceiver circuit. Optionally, the input/output interface may be an input/output circuit.

A seventh aspect of embodiments of this application provides a communication apparatus. The communication apparatus may be the LMF according to the second aspect, or may be a chip disposed in the LMF. The communication apparatus includes a processor that is coupled to a memory, and the processor may be configured to execute a computer program or instructions in the memory, to implement the method performed by a terminal device in any possible implementation of the foregoing solutions. Optionally, the communication apparatus further includes the memory. Optionally, the communication apparatus further includes a communication interface, and the processor is coupled to the communication interface.

When the communication apparatus is the LMF, the communication interface may be a transceiver or an input/output interface, configured to receive and send a signal or input/output a computer program or instructions.

When the communication apparatus is the chip disposed in the LMF, the communication interface may be an input/output interface, configured to receive and send a signal or input/output a computer program or instructions, where the inputting corresponds to a receiving or an obtaining operation, and the outputting corresponds to a sending operation.

Optionally, the transceiver may be a transceiver circuit. Optionally, the input/output interface may be an input/output circuit.

An eighth aspect of embodiments of this application provides a computer program. When the program is executed by a processor, the processor is configured to perform the method according to any one of the first aspect or the second aspect.

A ninth aspect of embodiments of this application provides a computer program product. The program product includes computer program code. When the program code is run by a communication unit, a processing unit, a transceiver, or a processor of a communication apparatus (for example, a network device), the communication device performs the method according to any one of the first aspect or the second aspect.

A tenth aspect of embodiments of this application provides a computer-readable storage medium. The computer-readable storage medium stores a computer program or instructions, and the computer program or the instructions enable a communication apparatus (for example, a network device) to perform the method according to any one of the first aspect or the second aspect.

In this embodiment of this application, if the foregoing apparatus corresponds to a chip, and a transceiver or a transceiver module may be replaced with an input/output interface, a receiving operation corresponds to inputting or obtaining, and a sending operation corresponds to outputting.

According to the foregoing technical solutions, it can be learned that embodiments of this application have the following advantages.

In embodiments of this application, an allocation relationship (a correspondence) between an SRS resource and UE is managed by an LMF, and a base station is an executor of resource allocation. When determining that a first UE needs to be positioned in an LA including a plurality of cells, the LMF may construct a unique correspondence between a first SRS resource and the first UE. After receiving a first correspondence from the LMF, a target base station may allocate the first SRS resource to the first UE based on the first correspondence. In the LA, the LMF allocates the first SRS resource only to the first UE for use. Therefore, the remaining UE cannot use the first SRS resource. This can effectively avoid an inter-cell SRS resource conflict.

DESCRIPTION OF EMBODIMENTS

Figure 1:
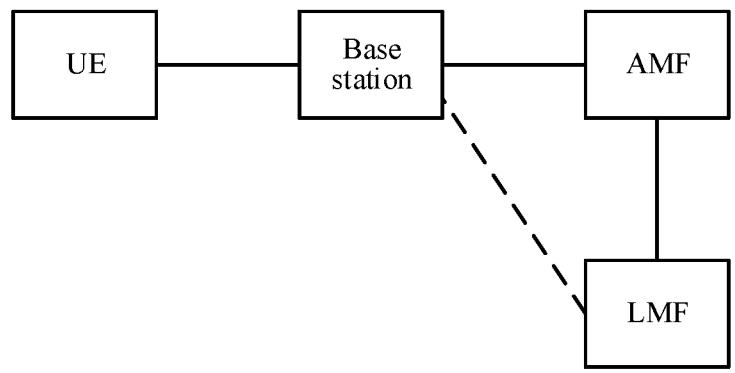
FIG. 1 is a schematic diagram of a system architecture according to an embodiment of this application.

Embodiments of this application provide a resource allocation method and a related device, to effectively avoid an inter-cell SRS resource conflict.

In the specification, claims, and accompanying drawings of this application, terms "first", "second", and so on are intended to distinguish between similar objects but do not necessarily indicate a specific order or sequence. It should be understood that data termed in such a way are interchangeable in proper circumstances so that embodiments described herein can be implemented in other orders than an order illustrated or described herein. Moreover, terms "include", "contain", and any other variants mean to cover the non-exclusive inclusion, for example, a process, method, system, product, or device that includes a list of steps or modules is not necessarily limited to those expressly listed steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into units in this application is logical division. During actual application, there may be another division manner. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electrical or other similar forms. This is not limited in this application. In addition, units or subunits described as separate parts may or may not be physically separate, may or may not be physical units, or may be distributed into a plurality of circuit units. All or a part of the units may be selected based on actual requirements to achieve the objectives of the solutions of this application.

It should be understood that, in embodiments of this application, "at least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following pieces (items)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In addition, it should be understood that in descriptions of this application, the terms such as "first" and "second" are merely intended for distinction and description, and should not be understood as an indication or implication of relative importance, cannot be understood as an indication or implication of a sequence, and cannot represent a quantity.

The technical solutions in embodiments of this application may be applied to various communication systems, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. Terms "system" and "network" may be interchanged with each other. For example, the technical solutions in embodiments of this application may be applied to a 3GPP-LTE system, various versions evolved based on LTE, and a communication system such as fifth generation new radio (5G NR). In addition, the communication system is further applicable to future-oriented communication technologies, and is applicable to all the technical solutions provided in embodiments of this application. The system architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to resolving similar technical problems.

For ease of understanding, the following briefly describes a system architecture according to an embodiment of this application with reference to FIG. 1. FIG. 1 is a schematic diagram of a system architecture according to an embodiment of this application. As shown in FIG. 1, the system architecture includes UE, a base station, an LMF, and an access management function (AMF). The UE is wirelessly connected to the base station, the base station is configured to connect the UE to a core network side, and both the LMF and the AMF are devices on the core network side, and may position the UE.

Specifically, the foregoing system structure may be applied to a 5G 2B campus scenario. In this scenario, it is required in personnel/asset management that locations of all personnel/assets on a campus need to be tracked and managed, to ensure security of the campus assets and stable campus operation. The following describes the foregoing scenario with reference to FIG. 2.

Figure 2:
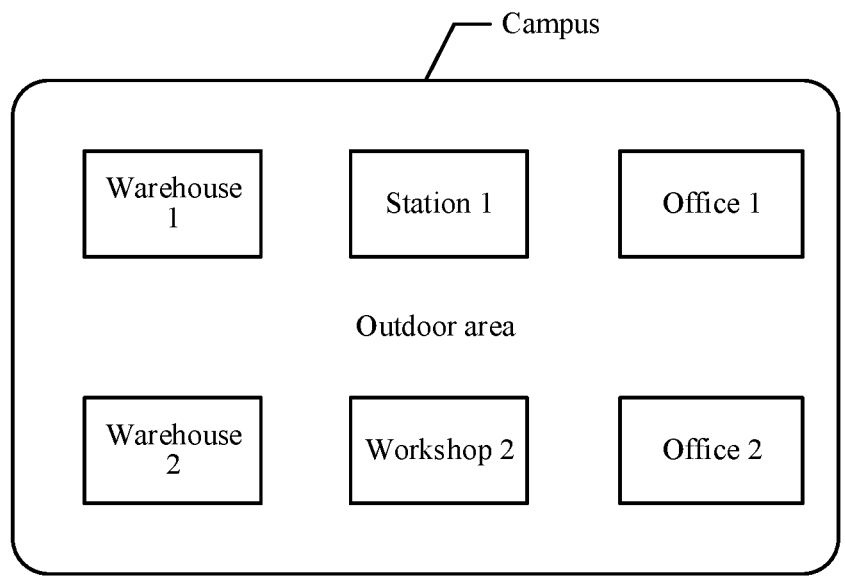
FIG. 2 is a schematic diagram of an LA according to an embodiment of this application.

FIG. 2 is a schematic diagram of an LA according to an embodiment of this application. As shown in FIG. 2, a 2B campus may be divided into different LAs. For example, seven closed LAs, namely, warehouse 1, warehouse 2, workshop 1, workshop 2, office 1, office 2, and an outdoor area on the campus may be obtained through division. Each LA occupies a different area, and each LA includes a plurality of cells. Each cell corresponds to one serving base station, or the plurality of cells correspond to a same serving base station.

An LMF may centrally manage UEs in each LA, select a unique SRS resource available for each UE, and notify a base station serving a cell in which the UE is located, so that the base station allocates the SRS resource to the UE. It may be understood that, when a UE moves within a same LA, an SRS resource allocated to the UE is always valid (that is, the UE may always use the SRS resource allocated to the UE), and the SRS resource does not need to be changed. If the UE enters a new LA from the current LA, the SRS resource needs to be changed.

It should be noted that the SRS resource mentioned in embodiments is an SRS resource dedicated to positioning, that is, the base station may perform TOA measurement on the SRS resource, to complete UE positioning. Based on this, a specific symbol may be selected in advance in a plurality of manners as the SRS resource dedicated to positioning. The following separately describes the symbols.

(1) In a frequency division duplex (FDD) system and a time division duplex (TDD)—based system, an OFDM symbol in an uplink subframe other than an orthogonal frequency division multiplexing (OFDM) symbol for sending a physical uplink control channel (PUCCH) and a physical random access channel (PRACH) may be used as the SRS resource dedicated to positioning.

(2) In the TDD system, a part of OFDM symbols of a guard period (GP) and an uplink pilot timeslot (UpPTS) in a special subframe may be selected as the SRS resource. For example, when a ratio of the special subframe is 10:2:2, the eleventh OFDM symbol and/or the twelfth OFDM symbol in the special subframe may be selected as the SRS resources dedicated to positioning. For another example, when a ratio of the special subframe is 6:4:4, the seventh OFDM symbol, the eighth OFDM symbol, and the ninth OFDM symbol in the special subframe may be selected as the SRS resources dedicated to positioning. This is not specifically limited herein.

In conclusion, a plurality of SRS resources dedicated to positioning may be obtained by selecting a plurality of OFDM symbols at different locations in advance. Further, the LMF may maintain information about the plurality of SRS resources dedicated to positioning in each LA. The information may be configured on the LMF via a network management system, and SRS resources dedicated to positioning in neighboring LAs are kept as different as possible.

Figure 3:
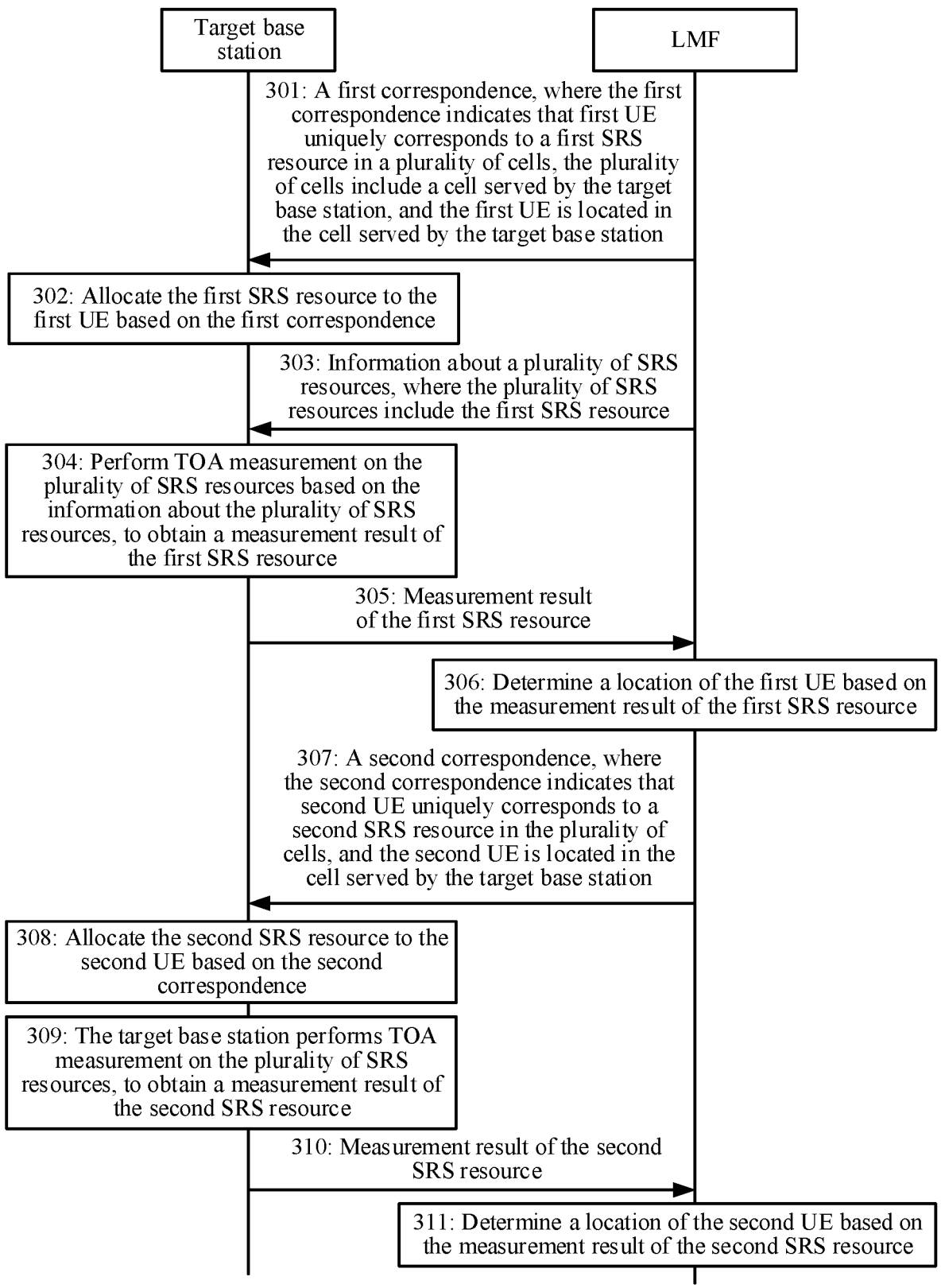
FIG. 3 is a schematic flowchart of a resource allocation method according to an embodiment of this application.

To further understand the foregoing positioning process, the following specifically describes the foregoing positioning process with reference to FIG. 3. FIG. 3 is a schematic flowchart of a resource allocation method according to an embodiment of this application. As shown in FIG. 3, the method includes the following steps.

301: An LMF sends a first correspondence to a target base station, where the first correspondence indicates that a first UE uniquely corresponds to a first SRS resource in a plurality of cells, the plurality of cells include a cell served by the target base station, and the first UE is located in the cell served by the target base station.

In this embodiment, when an AMF needs to position the first UE in a specific LA, the AMF may send a positioning request to the LMF. It should be noted that the LMF may centrally manage SRS resources in the LA, to select, for each UE located in the LA, an SRS resource uniquely corresponding to the UE. After receiving the positioning request from the AMF, the LMF may parse the positioning request. When determining that the first UE in the LA needs to be positioned, the LMF may determine, in the LA, the cell in which the first UE is located, to determine the target base station that serves the cell. Then, the unique first SRS resource available for the first UE is selected for the first UE from resources that can be provided by the target base station, to construct a unique correspondence, namely, the first correspondence, between the first UE and the first SRS resource.

It should be noted that the first UE is the $1^{st}$ UE that needs to be positioned in the LA. To be specific, before step 301, the LMF does not receive any positioning request related to the LA from the AMF. This may alternatively be understood as: The AMF does not need any UE in the LA to be positioned.

Then, the LMF may send a first positioning resource allocation request to the target base station, where the first positioning resource allocation request includes the first correspondence, so that the target base station performs resource allocation for the first UE.

302: The target base station allocates the first SRS resource to the first UE based on the first correspondence.

The target base station receives the first positioning resource allocation request from the LMF, and may obtain the first correspondence from the request. Then, the target base station may allocate the first SRS resource to the first UE based on the first correspondence, to complete allocating the SRS resource to the first UE. Then, the first UE may send an SRS on the first SRS resource.

After allocating the first SRS resource to the first UE, the target base station returns a first positioning resource allocation response to the LMF, to notify the LMF that SRS resource allocation to the first UE is completed.

303: The LMF sends information about a plurality of SRS resources to the target base station, where the plurality of SRS resources include the first SRS resource.

After determining that the target base station has completed allocating the SRS resource to the first UE, the LMF may send a positioning measurement request to the target base station, where the positioning measurement request includes the information about the plurality of SRS resources. It should be understood that the plurality of SRS resources herein are all SRS resources that can be used for positioning in the LA, and include the first SRS resource that has been allocated to the first UE.

It should be noted that when sending the positioning measurement request, the LMF not only sends the request to the target base station, but also sends the request to the remaining base station other than the target base station in the LA.

304: The target base station performs TOA measurement on the plurality of SRS resources based on the information about the plurality of SRS resources, to obtain a measurement result of the first SRS resource.

After receiving the positioning measurement request from the LMF, the target base station may obtain the information about the plurality of SRS resources from the request. Based on this part of information, the target base station may determine all SRS resources (namely, all the SRS resources that can be used for positioning and that are in the LA in which the first UE is located, including the first SRS resource and a to-be-mentioned second SRS resource and third SRS resource) that need to be measured by the target base station, and start to periodically perform TOA measurement on the SRS resources (where a measurement period in this case is the first measurement period related to the LA). Because the first UE has started to send the SRS on the first SRS resource, the target base station may obtain the measurement result of the first SRS resource after performing TOA measurement on the plurality of SRS resources.

In addition, because the remaining base station also receives the positioning measurement request, the remaining base station also starts to periodically perform TOA measurement on all the SRS resources that can be used for positioning in the LA. It should be noted that after completing TOA measurement on the first SRS resource, the remaining base station may also obtain the measurement result of the first SRS resource.

Further, after receiving the information about the plurality of SRS resources in the positioning measurement request, the target base station may perform a resource check based on the information. Specifically, the target base station also reserves a plurality of SRS resources dedicated to positioning. If the SRS resources indicated in the first positioning measurement request are not a subset of the SRS resources reserved by the target base station, the target base station uses the SRS resources indicated in the first positioning measurement request, to ensure that the plurality of SRS resources delivered by the LMF are not used for another purpose. Similarly, the remaining base station may also perform the same resource check operation. Details are not described herein. After determining that the resources are consistent, the base station may start to perform TOA measurement.

305: The target base station sends the measurement result of the first SRS resource to the LMF.

After obtaining the measurement result of the first SRS resource, the target base station sends the measurement result of the first SRS resource to the LMF.

The remaining base station other than the target base station also obtains a measurement result of the first SRS resource. However, this part of the base station does not always report, to the LMF, the measurement result of the first SRS resource obtained by the base station through measurement. Instead, each base station determines whether the measurement result obtained through measurement meets a preset reference signal received power (RSRP) requirement or signal to interference plus noise ratio (SINR) requirement. If the requirements are met, it indicates that the signal strength between the base station and the first UE is good, and the measurement result of the first SRS resource obtained by the base station may be fed back to the LMF. If the requirements are not met, it indicates that the signal strength between the base station and the first UE is poor, and the measurement result of the first SRS resource obtained by the base station is not sent.

306: The LMF determines a location of the first UE based on the measurement result of the first SRS resource.

After the LMF obtains the measurement result of the first SRS resource of the target base station and the measurement result of the first SRS resource of the remaining base station, because the first SRS resource uniquely corresponds to the first UE, the LMF performs location settlement based on the measurement results of the first SRS resource, to obtain the location of the first UE. In this way, positioning of the first UE is completed.

307: The LMF sends a second correspondence to the target base station, where the second correspondence indicates that a second UE uniquely corresponds to a second SRS resource in the plurality of cells, and the second UE is located in the cell served by the target base station.

When the AMF needs to position the second UE in the cell served by the target base station, the AMF may send a positioning request to the LMF. Then, the LMF selects, for the second UE, the unique second SRS resource available for the second UE from the resources that can be provided by the target base station, to construct a unique correspondence, namely, the second correspondence, between the second UE and the second SRS resource.

It should be noted that the second UE is a UE that is not the $1^{st}$ UE that needs to be positioned in the LA and that is located in the cell served by the target base station. For example, the second UE may be a UE that has been located within a coverage of the target base station and that newly accesses the cell served by the target base station. In this case, if the second UE needs to be positioned, the LMF may send a second positioning resource allocation request to the target base station, where the second positioning resource allocation request includes the second correspondence, so that the target base station performs resource allocation for the second UE. For another example, the second UE may be a UE that moves from a cell in another LA to the cell served by the target base station. In this case, if the second UE needs to be positioned, the LMF may send a positioning resource update message to the target base station, where the positioning resource update message includes the second correspondence, so that the target base station performs resource allocation for the second UE and the like.

308: The target base station allocates the second SRS resource to the second UE based on the second correspondence.

The target base station receives the first positioning resource allocation request or the positioning resource update message from the LMF, and may obtain the second correspondence from the message. Then, the target base station may allocate the second SRS resource to the second UE based on the second correspondence, to complete allocating the SRS resource to the second UE. Then, the second UE may send an SRS on the second SRS resource.

After allocating the second SRS resource to the second UE, the target base station notifies the LMF that SRS resource allocation to the second UE is complete.

309: The target base station performs TOA measurement on the plurality of SRS resources, to obtain a measurement result of the second SRS resource.

When a next measurement period (where the measurement period is after the first measurement period) is reached, the target base station may perform TOA measurement on the plurality of SRS resources again. Because the second UE has started to send the SRS on the second SRS resource, the target base station may obtain the measurement result of the second SRS resource after performing TOA measurement on the plurality of SRS resources. Similarly, the first UE may also send the SRS on the first SRS resource, and the target base station may also obtain the measurement result of the first SRS resource. Details are not described herein.

Similarly, the remaining base station may also obtain a measurement result of the second SRS resource. For details, refer to related descriptions in step 304. Details are not described herein.

In addition, in a specific measurement period, after performing TOA measurement on the plurality of SRS resources, the target base station may further obtain a measurement result of a third SRS resource, and report the measurement result of the third SRS resource to the LMF. It should be noted that the third SRS resource uniquely corresponds to a third UE located in the LA, and the third UE is located in a cell served by the remaining base station (that is located in the same LA as the target base station). It should be noted that, after completing the positioning of the first UE, the LMF may further need to position the third UE located in the cell served by the remaining base station. Similarly, the LMF may allocate the third SRS resource to the third UE via the remaining base station, to complete positioning. For a process thereof, refer to step 307 to step 309, but an execution body is changed to the remaining base station. Details are not described herein.

Therefore, the target base station may obtain the measurement result of the third SRS resource and the measurement result of the second SRS resource in a same measurement period, or may obtain the measurement result of the third SRS resource and the measurement result of the second SRS resource in different measurement periods (but both are after the first measurement period). This is not limited herein.

310: The target base station sends the measurement result of the second SRS resource to the LMF.

After obtaining the measurement result of the second SRS resource, the target base station sends the measurement result of the second SRS resource to the LMF.

The remaining base station may also obtain the measurement result of the second SRS resource, and send the measurement result of the second SRS resource obtained by the remaining base station to the LMF.

311: The LMF determines a location of the second UE based on the measurement result of the second SRS resource.

After the LMF obtains the measurement result of the second SRS resource of the target base station and the measurement result of the second SRS resource of the remaining base station, because the second SRS resource uniquely corresponds to the second UE, the LMF performs location settlement based on the measurement results of the second SRS resource, to obtain the location of the second UE. In this way, positioning of the second UE is completed.

Similarly, the LMF may further complete location settlement of the third UE, to obtain a location of the third UE. For a process thereof, refer to the foregoing location settlement process of the second UE. Details are not described herein.

It can be learned by comparing the positioning process of the first UE and the positioning process of the second UE that, the LMF needs to deliver a positioning measurement request to all base stations in the LA only in the positioning process of the first UE (namely, the $1^{st}$ UE that needs to be positioned in the LA), and does not need to deliver a positioning measurement request in a subsequent positioning process of UEs (for example, the second UE and the third UE). This can effectively reduce signaling interaction between the LMF and the base station, to implement energy saving.

In addition, when the LMF does not need to position the UE in the LA, the LMF notifies all the base stations in the LA to stop performing TOA measurement.

Further, step 301 to step 311 are all used to position the UE in the same LA. If the LMF further needs to locate the UE in another LA, the LMF may also perform a process similar to step 301 to step 309. Details are not described herein.

In this embodiment, instead of being allocated only by the base station to the UE, the SRS resource dedicated to positioning is centrally managed by the LMF, to avoid an inter-cell SRS resource conflict. In addition, when the UE moves across cells, signaling message interaction caused by a change of a measured cell is effectively avoided, to implement energy saving.

Figure 4:
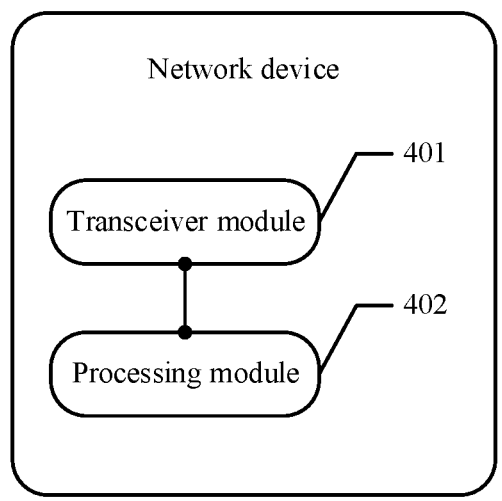
FIG. 4 is a schematic diagram of a structure of a network device according to an embodiment of this application.

The foregoing describes in detail the resource allocation method provided in embodiments of this application. The following describes a communication apparatus provided in embodiments of this application. In embodiments of this application, an antenna that has a receiving and sending function and a radio frequency circuit may be considered as a transceiver unit of a network device, and a processor that has a processing function may be considered as a processing module of the network device. FIG. 4 is a schematic diagram of a structure of a network device according to an embodiment of this application. As shown in FIG. 4, the network device includes a transceiver module 401 and a processing module 402. The transceiver module 401 may also be referred to as a transceiver, a transceiver apparatus, or the like. The processing module may also be referred to as a processor, a processing board, a processing module, a processing apparatus, or the like. Optionally, a component for implementing a receiving function in the transceiver module 401 may be considered as a receiving module, and a component for implementing a sending function in the transceiver module 401 may be considered as a sending module. That is, the transceiver module includes the receiving module and the sending module. The transceiver module 401 may also be sometimes referred to as a transceiver, a transceiver circuit, or the like. The receiving module may also be sometimes referred to as a receiver, a receive circuit, or the like. The sending module may also be sometimes referred to as a transmitter, a transmit circuit, or the like. It should be understood that the transceiver module 401 is configured to perform a sending operation and a receiving operation of the target base station in the embodiment shown in FIG. 3, and the processing module 402 is configured to perform an operation other than the sending operation and the receiving operation of the target base station in the embodiment shown in FIG. 3.

Specifically, the transceiver module 401 is configured to receive a first correspondence from a location management function LMF, where the first correspondence indicates that a first user equipment UE uniquely corresponds to a first SRS resource in a plurality of cells, the plurality of cells include a cell served by a target base station, and the first UE is located in the cell served by a communication apparatus.

The processing module 402 is configured to allocate the first SRS resource to the first UE based on the first correspondence.

In a possible implementation, the transceiver module 401 is further configured to receive information about a plurality of SRS resources from the LMF, where the plurality of SRS resources include the first SRS resource.

The processing module 402 is further configured to perform time of arrival TOA measurement on the plurality of SRS resources based on the information about the plurality of SRS resources, to obtain a measurement result of the first SRS resource.

The transceiver module 401 is further configured to send the measurement result of the first SRS resource to the LMF.

In a possible implementation, the transceiver module 401 is further configured to receive a second correspondence from the LMF, where the second correspondence indicates that second UE uniquely corresponds to a second SRS resource in the plurality of cells, and the second UE is located in the cell served by the target base station.

The processing module 402 is further configured to allocate the second SRS resource to the second UE based on the second correspondence.

The processing module 402 is further configured to perform TOA measurement on the plurality of SRS resources, to obtain a measurement result of the second SRS resource.

The transceiver module 401 is further configured to send the measurement result of the second SRS resource to the LMF.

In a possible implementation, the processing module 402 is further configured to perform TOA measurement on the plurality of SRS resources, to obtain a measurement result of a third SRS resource, where the plurality of SRS resources include the third SRS resource, the third SRS resource uniquely corresponds to third UE in the plurality of cells, and the third UE is located in a cell served by the remaining base station.

The transceiver module 401 is further configured to send the measurement result of the third SRS resource to the LMF.

Figure 5:
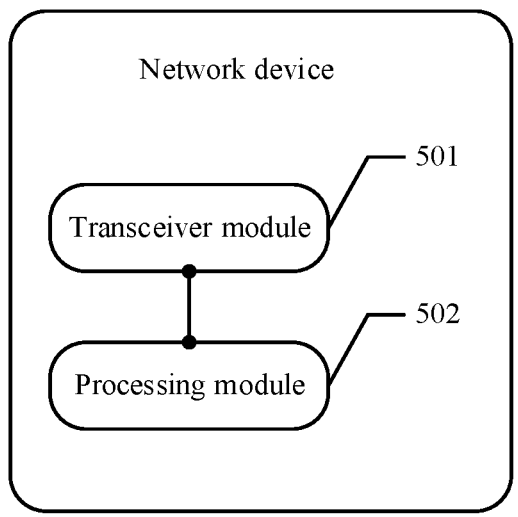
FIG. 5 is another schematic diagram of a structure of a network device according to an embodiment of this application.

FIG. 5 is another schematic diagram of a structure of a network device according to an embodiment of this application. As shown in FIG. 5, the network device includes a transceiver module 501 and a processing module 502. The transceiver module 501 may also be referred to as a transceiver, a transceiver apparatus, or the like. The processing module may also be referred to as a processor, a processing board, a processing module, a processing apparatus, or the like. Optionally, a component for implementing a receiving function in the transceiver module 501 may be considered as a receiving module, and a component for implementing a sending function in the transceiver module 501 may be considered as a sending module. That is, the transceiver module includes the receiving module and the sending module. The transceiver module 501 may also be sometimes referred to as a transceiver, a transceiver circuit, or the like. The receiving module may also be sometimes referred to as a receiver, a receive circuit, or the like. The sending module may also be sometimes referred to as a transmitter, a transmit circuit, or the like. It should be understood that the transceiver module 501 is configured to perform a sending operation and a receiving operation of the LMF in the embodiment shown in FIG. 3, and the processing module 502 is configured to perform an operation other than the sending operation and the receiving operation of the LMF in the embodiment shown in FIG. 3.

Specifically, the processing module 502 is configured to send a first correspondence to a target base station via the transceiver module 501, where the first correspondence indicates that first UE uniquely corresponds to a first SRS resource in a plurality of cells, the plurality of cells include a cell served by the target base station, and the first UE is located in the cell served by the target base station.

In a possible implementation, the transceiver module 501 is further configured to send information about a plurality of SRS resources to the target base station, where the plurality of SRS resources include the first SRS resource.

The transceiver module 501 is further configured to receive a measurement result of the first SRS resource from the target base station.

The processing module 502 is further configured to determine a location of the first UE based on the measurement result of the first SRS resource.

In a possible implementation, the transceiver module 501 is further configured to send a second correspondence to the target base station, where the second correspondence indicates that a second UE uniquely corresponds to a second SRS resource in the plurality of cells, and the second UE is located in the cell served by the target base station.

The transceiver module 501 is further configured to receive a measurement result of the second SRS resource from the target base station.

The processing module 502 is further configured to determine a location of the second UE based on the measurement result of the second SRS resource.

In a possible implementation, the transceiver module 501 is further configured to receive a measurement result of a third SRS resource from the target base station.

The processing module 502 determines a location of a third UE based on the measurement result of the third SRS resource, where the plurality of SRS resources include the third SRS resource, the third SRS resource uniquely corresponds to the third UE in the plurality of cells, and the third UE is located in a cell served by the remaining base station.

It should be noted that, content such as information exchanged between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

Figure 6:
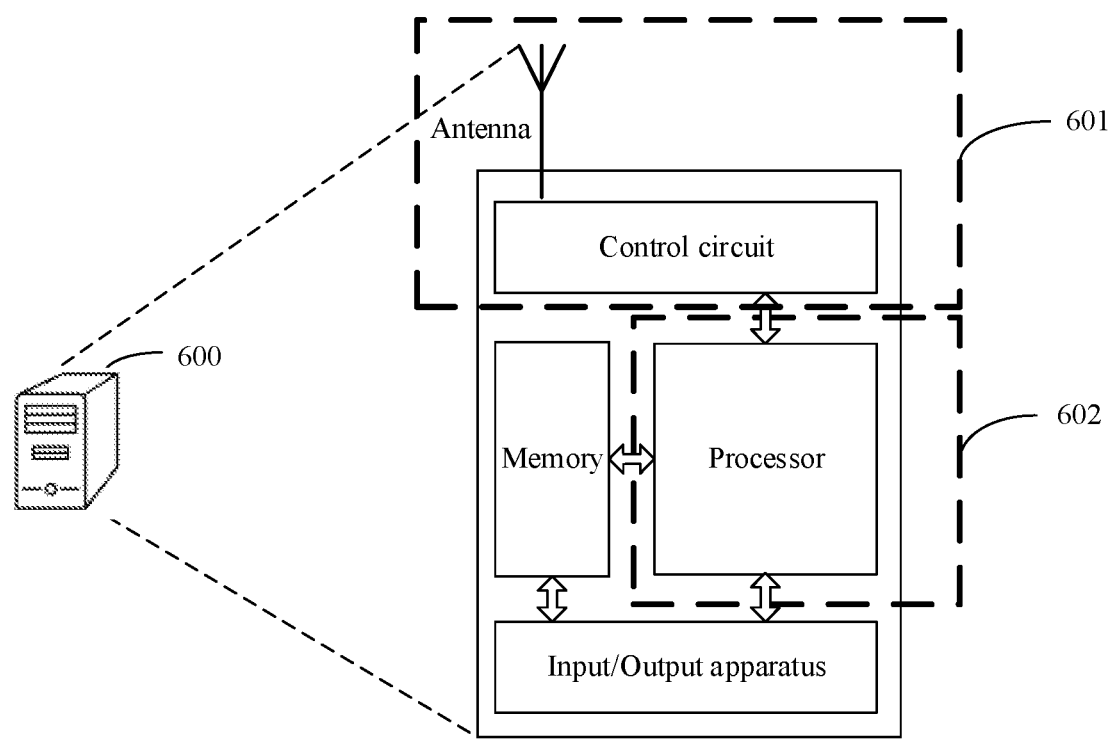
FIG. 6 is still another schematic diagram of a structure of a network device according to an embodiment of this application.

FIG. 6 is still another schematic diagram of a structure of a network device according to an embodiment of this application. As shown in FIG. 6, the network device 600 is applicable to the system shown in FIG. 1, and performs functions of the target base station, the remaining base station, or the LMF in the foregoing method embodiments. For ease of description, FIG. 6 shows only main components of the network device. As shown in FIG. 6, the network device 600 includes a processor, a memory, a control circuit, an antenna, and an input/output apparatus. The processor is mainly configured to: process a communication protocol and communication data, control the entire network device, execute a software program, and process data of the software program. For example, the processor is configured to support the network device in performing actions described in the foregoing method embodiments, for example, receiving a usage threshold of a wake-up signal, and determining, based on the usage threshold and an eDRX cycle, whether to monitor the wake-up signal. The memory is mainly configured to store the software program and the data, for example, store the usage threshold of the wake-up signal described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in an electromagnetic wave form. The input/output apparatus, such as a touchscreen, a display, or a keyboard, is mainly configured to: receive data input by a user and output data to a user.

After the network device is powered on, the processor may read the software program in a storage unit, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form to the outside. When data is sent to the network device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 6 shows only one memory and only one processor. In an actual network device, there may be a plurality of processors and a plurality of memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communication data. The central processing unit is mainly configured to: control the entire network device, execute the software program, and process the data of the software program. Functions of the baseband processor and the central processing unit may be integrated into the processor in FIG. 6. A person skilled in the art may understand that the baseband processor and the central processing unit may alternatively be processors independent of each other, and are interconnected by using a technology such as a bus. A person skilled in the art may understand that the network device may include a plurality of baseband processors to adapt to different network standards, and may include a plurality of central processing units to enhance a processing capability of the network device. The components of the network device may be connected through various buses. The baseband processor may also be expressed as a baseband processing circuit or a baseband processing chip. The central processing unit may also be expressed as a central processing circuit or a central processing chip. A function of processing the communication protocol and the communication data may be built into the processor, or may be stored in the storage unit in a form of a software program, and the processor executes the software program to implement a baseband processing function.

In this embodiment of this application, the antenna that has a transceiver function and the control circuit may be considered as a transceiver 601 of the network device 600. For example, the transceiver 601 is configured to support the network device in performing the foregoing receiving function and sending function. The processor having a processing function is considered as a processor 602 of the network device 600. As shown in FIG. 6, the network device 600 includes the transceiver 601 and the processor 602. The transceiver may also be referred to as a transceiver apparatus or the like. Optionally, a component that is in the transceiver 601 and that is configured to implement a receiving function may be considered as a receiving unit, and a component that is in the transceiver 601 and that is configured to implement a sending function may be considered as a sending unit. In other words, the transceiver 601 includes the receiving unit and the sending unit. The receiving unit may also be referred to as a receiver, an input interface, a receiver circuit, or the like. The sending unit may be referred to as a transmitter, a transmitter circuit, or the like.

The processor 602 may be configured to execute instructions stored in the memory, to control the transceiver 601 to receive a signal and/or send a signal, to complete a function of the network device in the foregoing method embodiments. In an implementation, it may be considered that a function of the transceiver 601 is implemented by using a transceiver circuit or a dedicated transceiver chip.

An embodiment of this application further relates to a processor, configured to perform the method in the embodiment shown in FIG. 3.

An embodiment of this application further relates to a computer program. When the program is executed by a processor, the processor is configured to perform the method in the embodiment shown in FIG. 3.

An embodiment of this application further relates to a computer program product. The program product includes computer program code. When the program code is run by a communication unit, a processing unit, a transceiver, or a processor of a communication apparatus (for example, a network device), the communication device performs the method in the embodiment shown in FIG. 3.

An embodiment of this application further relates to a computer-readable storage medium. The computer-readable storage medium stores a computer program or instructions. The computer program or the instructions enable a communication apparatus (for example, a network device) to perform the method in the embodiment shown in FIG. 3.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

What is claimed is:

1. A resource allocation method comprising:
   receiving, by a target base station, a first correspondence from a location management function (LMF), wherein the first correspondence indicates that a first user equipment (UE) uniquely corresponds to a first sounding reference signal (SRS) resource in a plurality of cells, the plurality of cells comprising a cell served by the target base station, and the first UE is located in the cell served by the target base station; and
   allocating, by the target base station, the first SRS resource only to the first UE based on the first correspondence so that no other UEs can use the first SRS resource in order to avoid an inter-cell SRS resource conflict.

2. The method according to claim 1, wherein after allocating the first SRS resource to the first UE, the method further comprises:
   receiving, by the target base station, information about a plurality of SRS resources from the LMF, wherein the plurality of SRS resources comprise the first SRS resource;
   performing, by the target base station, a time of arrival (TOA) measurement on the plurality of SRS resources based on the information about the plurality of SRS resources, to obtain a measurement result of the first SRS resource; and
   sending, by the target base station, the measurement result of the first SRS resource to the LMF.

3. The method according to claim 2, wherein after receiving the information about the plurality of SRS resources, the method further comprises:
   receiving, by the target base station, a second correspondence from the LMF, wherein the second correspondence indicates that a second UE uniquely corresponds to a second SRS resource in the plurality of cells, and the second UE is located in the cell served by the target base station;
   allocating, by the target base station, the second SRS resource to the second UE based on the second correspondence;
   performing, by the target base station, a second TOA measurement on the plurality of SRS resources, to obtain a measurement result of the second SRS resource; and
   sending, by the target base station, the measurement result of the second SRS resource to the LMF.

4. The method according to claim 2, wherein after receiving the information about the plurality of SRS resources from the LMF, the method further comprises:
   performing, by the target base station, a second TOA measurement on the plurality of SRS resources, to obtain a measurement result of a second SRS resource, wherein the plurality of SRS resources comprise the second SRS resource, the second SRS resource uniquely corresponds to a second UE in the plurality of cells, and the second UE is located in a cell served by a remaining base station; and
   sending, by the target base station, the measurement result of the second SRS resource to the LMF.

5. The method according to claim 1, wherein the SRS resource is an SRS resource dedicated to positioning.

6. The method according to claim 5, wherein an orthogonal frequency division multiplexing (OFDM) symbol in an uplink subframe, other than an OFDM symbol for sending a physical uplink control channel (PUCCH) and a physical random access channel (PRACH), is used as the SRS resource dedicated to positioning.

7. A target base station, comprising:
   at least one processor; and
   one or more memories including computer instructions that, when executed by the at least one processor, cause the target base station to perform operations comprising:
   receiving a first correspondence from a location management function (LMF), wherein the first correspondence indicates that a first user equipment (UE) uniquely corresponds to a first sounding reference signal (SRS) resource in a plurality of cells, the plurality of cells comprising a cell served by the target base station, and the first UE is located in the cell served by the target base station; and
   allocating the first SRS resource only to the first UE based on the first correspondence so that no other UEs can use the first SRS resource in order to avoid an inter-cell SRS resource conflict.

8. The target base station according to claim 7, wherein the operations further comprise:
   after allocating the first SRS resource to the first UE,
   receiving information about a plurality of SRS resources from the LMF, wherein the plurality of SRS resources comprise the first SRS resource;
   performing a time of arrival (TOA) measurement on the plurality of SRS resources based on the information about the plurality of SRS resources, to obtain a measurement result of the first SRS resource; and
   sending the measurement result of the first SRS resource to the LMF.

9. The target base station according to claim 8, wherein the operations further comprise:
   after receiving the information about the plurality of SRS resources,
   receiving a second correspondence from the LMF, wherein the second correspondence indicates that a second UE uniquely corresponds to a second SRS resource in the plurality of cells, and the second UE is located in the cell served by the target base station;

allocating the second SRS resource to the second UE based on the second correspondence;
performing a second TOA measurement on the plurality of SRS resources, to obtain a measurement result of the second SRS resource; and
sending the measurement result of the second SRS resource to the LMF.

10. The target base station according to claim 8, wherein the operations further comprise:
after receiving the information about the plurality of SRS resources,
performing a second TOA measurement on the plurality of SRS resources, to obtain a measurement result of a second SRS resource, wherein the plurality of SRS resources comprise the second SRS resource, the second SRS resource uniquely corresponds to a second UE in the plurality of cells, and the second UE is located in a cell served by a remaining base station; and
sending the measurement result of the second SRS resource to the LMF.

11. The method according to claim 7, wherein the SRS resource is an SRS resource dedicated to positioning.

12. The method according to claim 11, wherein an orthogonal frequency division multiplexing (OFDM) symbol in an uplink subframe, other than an OFDM symbol for sending a physical uplink control channel (PUCCH) and a physical random access channel (PRACH), is used as the SRS resource dedicated to positioning.

13. A location management function (LMF), comprising:
at least one processor; and
one or more memories including computer instructions that, when executed by the at least one processor, cause the LMF to perform operations comprising:
sending a first correspondence to a target base station, wherein the first correspondence indicates that a first user equipment (UE) uniquely corresponds to a first sounding reference signal (SRS) resource in a plurality of cells, the plurality of cells comprising a cell served by the target base station, and the first UE is located in the cell served by the target base station, wherein no other UEs can use the first SRS resource in order to avoid an inter-cell SRS resource conflict.

14. The LMF according to claim 13, wherein the operations further comprise:
after sending the first correspondence to the target base station,
sending information about a plurality of SRS resources to the target base station, wherein the plurality of SRS resources comprise the first SRS resource;
receiving a measurement result of the first SRS resource from the target base station; and
determining a location of the first UE based on the measurement result of the first SRS resource.

15. The LMF according to claim 14, wherein the operations further comprise:
after sending the information about the plurality of SRS resources,
sending a second correspondence to the target base station, wherein the second correspondence indicates that a second UE uniquely corresponds to a second SRS resource in the plurality of cells, and the second UE is located in the cell served by the target base station;
receiving a measurement result of the second SRS resource from the target base station; and
determining a location of the second UE based on the measurement result of the second SRS resource.

16. The LMF according to claim 14, wherein the operations further comprise:
after sending the information about the plurality of SRS resources,
receiving a measurement result of a second SRS resource from the target base station; and
determining a location of second UE based on the measurement result of the second SRS resource, wherein the plurality of SRS resources comprise the second SRS resource, the second SRS resource uniquely corresponds to the second UE in the plurality of cells, and the second UE is located in a cell served by a remaining base station.

17. The LMF of claim 13 wherein the operations further comprise:
before sending the first correspondence to the target base station,
receiving a positioning request from an access management function (AMF);
parsing the positioning request; and
determining, in a location area (LA), the cell in which the first UE is located, to determine the target base station that serves the cell.

18. The method according to claim 13, wherein the SRS resource is an SRS resource dedicated to positioning.

19. The method according to claim 18, wherein an orthogonal frequency division multiplexing (OFDM) symbol in an uplink subframe, other than an OFDM symbol for sending a physical uplink control channel (PUCCH) and a physical random access channel (PRACH), is used as the SRS resource dedicated to positioning.

* * * * *